United States Patent Office 3,070,616
Patented Dec. 25, 1962

3,070,616
OXIDATION OF TRIALKYLALUMINUM IN THE PRESENCE OF ALUMINUM TRIALKOXIDE
Pat W. K. Flanagan, Ponca City, Okla., assignor to Continental Oil Company, Ponca City, Okla., a corporation of Delaware
No Drawing. Filed Mar. 31, 1960, Ser. No. 18,834
5 Claims. (Cl. 260—448)

This invention relates to a method for the preparation of aluminum trialkoxide compounds and more particularly it relates to a method for the preparation of such compounds by a process involving the partial oxidation of trialkylaluminum compounds. In another aspect, the invention relates to an improved method for converting alkylaluminum dialkoxide to aluminum trialkoxide.

It is known that aluminum trialkoxide compounds can be produced by the oxidation of trialkylaluminum compounds using molecular oxygen as the oxidizing agent in accordance to the following equation.

(1) $2R_3Al + 3O_2 \rightarrow 2(RO)_3Al$

The prior art methods have generally possessed a number of disadvantages of either requiring a long reaction time or the use of relatively high temperatures together with a large excess of oxygen. Furthermore, even under those conditions, the reaction could not be carried out to a substantial degree of completion.

It is, therefore, a principal object of the present invention to provide a process for the production of aluminum trialkoxide compounds which obviates the disadvantages of the prior art processes.

It is another object of my invention to provide a process for the production of aluminum trialkoxide compounds by a process which is simple and economical to operate.

It is another object of this invention to provide a process for the production of aluminum trialkoxide compounds which can be carried out at relatively low pressures and temperatures.

These and other objects and advantages of the invention will become apparent from the following detailed description and discussion.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

The foregoing objects and advantages are attained broadly by the conversion of alkylaluminum dialkoxide by oxidation to aluminum trialkoxide in the presence of added aluminum trialkoxide. In one aspect of the invention, a trialkylaluminum compound is allowed to react with oxygen under oxidizing conditions until substantially all of the trialkylaluminum compound has been converted to an alkylaluminum dialkoxide compound. To the reaction mixture is then added an aluminum trialkoxide compound after which the oxidation step employing gaseous oxygen is resumed. By this method the reaction time can be materially reduced.

While I do not wish to be bound by any particular theory as to how my desirable results are obtained, I believe the following explanation is substantially correct. Instead of the reaction proceeding in one step as Equation 1 indicates, the reaction proceeds in three steps which may be expressed equationwise as follows:

(2) $2R_3Al + O_2 \rightarrow 2ROAlR_2$
(3) $2ROAlR_2 + O_2 \rightarrow 2(RO)_2AlR$
(4) $2(RO)_2AlR + O_2 \rightarrow 2(RO)_3Al$ As a result of my investigations, I have found that the reactions denoted by Equations 2 and 3 proceed very rapidly but that the third stage of the oxidation reaction denoted by Equation 4 proceeds at a much slower rate. I have found further that the third stage of the oxidation can be accelerated to a marked extent by adding to the reaction mixture a quantity of aluminum trialkoxide. The amount of trialkoxide which is used can vary widely, since even very small amounts accelerate the third stage oxidation reaction. Usually it is preferred to employ between ¼ to 2 moles of trialkoxide per mole of the alkylaluminum dialkoxide present. The alkyl groups of the aluminum trialkoxide can be either the same or different from the alkyl groups present in the alkylaluminum dialkoxide reactant. Since the final product, the aluminum trialkoxide, is used as an intermediate for the preparation of, as one example alcohols, it would simplify matters if all the alkyl groups were the same; otherwise a further purification step is necessary to isolate the individual alcohols. The same reason applies if the final product is other than an alcohol. As a general rule, however, the alkyl groups are not the same, particularly when the original trialkylaluminum compound used is the so-called "growth product." When such a product is used in my process, the final products must be separated into the individual components, which methods are well known to those skilled in the art. As, for example, if the reaction products are alcohols, fractional distillation is used for the separation of the alcohols.

Before proceeding with specific examples illustrating my invention, it may be well to indicate in general the nature of the materials required in the process.

Suitable trialkylaluminum compounds include such compounds wherein the carbon content of the alkyl radicals varies from 1 to about 20 or even more. Specific compounds which can be employed are tripropylaluminum, tributylaluminum, triisobutylaluminum, trihexylaluminum, trioctylaluminum, tri-(2-ethylhexyl)-aluminum, tridodecylaluminum, trioctadecylaluminum, ethylbutylhexylaluminum, and the like. Although theoretically there is no limit to the number of carbons in the alkyl radical that can be used, I generally prefer to employ a trialkylaluminum compound wherein the carbon content of the alkyl radicals varies from 2 to 20.

The oxidizing gas may be oxygen, oxygen diluted with an inert gas, air, enriched air, etc.

Suitable and preferred reaction conditions for carrying out the oxidation reactions denoted by Equations 3 and 4 vary from about −10 to about 60° C. and about 0 to about 30° C., respectively, and from about 1 to about 30 p.s.i. and about 3 to about 20 p.s.i. as the partial pressure of the oxygen, respectively.

In order to disclose the nature of the present invention still more clearly, the following illustrative examples will be given. It is to be understood that the invention is not to be limited to the specific conditions or details set forth in these examples except insofar as such limitations are specified in the appended claims. Since methods of preparing alkylaluminum dialkoxide compounds from trialkylaluminum compounds are well known and are disclosed in the literature, those methods will not be described here.

Example 1

Two solutions were prepared in a dried hexane solvent. Solution A contained only ethylaluminum diethoxide. Solution B contained the same amount of ethylaluminum diethoxide plus an amount of aluminum triethoxide equal to 62 percent of the ethylaluminum diethoxide on a mole basis. Each solution was contacted with one atmosphere of oxygen at a controlled temperature of 0° C. The percent oxidation of each solution as a function of time is listed below:

| Time (minutes) | Percent Oxidation of $(RO)_2AlR$ | |
|---|---|---|
| | Solution A | Solution B |
| 40 | 14.7 | 21.7 |
| 60 | 24.5 | 41.1 |
| 80 | 33.0 | 53.2 |
| 100 | 41.9 | 62.4 |
| 140 | 54.8 | 73.4 |
| 180 | 63.2 | 79.2 |
| 240 | 72.2 | 84.1 |

The time required for complete oxidation was materially shorter for solution B.

*Example 2*

Two solutions were prepared in a dried hexane solvent. Solution C contained hexylaluminum dihexoxide plus an amount of aluminum trihexoxide equal to 15 percent of the hexylaluminum dihexoxide on a mole basis. Solution D contained the same amount of hexylaluminum dihexoxide plus an amount of aluminum trihexoxide equal to 117 percent of the hexylaluminum dihexoxide on a mole basis. Each solution was contacted with one atmosphere of oxygen at a controlled temperature of 0° C. The percent oxidation of each solution as a function of time is listed below:

| Time (minutes) | Percent Oxidation of $(RO)_2AlR$ | |
|---|---|---|
| | Solution C | Solution D |
| 30 | 6.0 | 13.5 |
| 60 | 11.3 | 23.2 |
| 90 | 17.2 | 31.1 |
| 120 | 21.9 | 37.5 |
| 150 | 26.3 | 43.2 |
| 180 | 29.6 | 47.9 |
| 200 | 31.8 | 51.1 |

The time required for complete oxidation of solution D was considerably less than for solution C.

While particular embodiments of the invention have been described, it will be understood, of course, that the invention is not limited thereto since many modifications may be made, and it is therefore contemplated to cover by the appended claims any such modifications as fall within the true spirit and scope of the invention.

The invention having been described, what is claimed and desired to be secured by Letters Patent is:

1. A method for the preparation of aluminum trialkoxide which comprises reacting trialkylaluminum with a gas containing molecular oxygen under oxidation conditions until substantially all of said trialkylaluminum has been converted to alkylaluminum dialkoxide, then adding to the reaction mixture from about 0.25 to about 2 moles of an aluminum trialkoxide per mole of alkylaluminum dialkoxide, and reacting the resulting mixture with an additional quantity of a gas containing molecular oxygen under oxidation conditions until all of said alkylaluminum dialkoxide has been oxidized to aluminum trialkoxide.

2. A method for converting alkylaluminum dialkoxide to aluminum trialkoxide which comprises adding from about 0.25 to about 2 moles of aluminum trialkoxide per mole of alkylaluminum dialkoxide and reacting said alkylaluminum dialkoxide with oxygen.

3. The process of claim 2 in which the carbon content of the alkyl groups of said alkylaluminum dialkoxide varies from 2 to 20, said oxidation reaction is carried out at a temperature from about −10 to about 60° C., and the partial pressure of the oxygen in said reaction varies from about 1 to about 30 p.s.i.

4. The process of claim 3 wherein the alkylaluminum dialkoxide is ethylaluminum diethoxide, the added aluminum trialkoxide is aluminum triethoxide.

5. The process of claim 3 wherein the alkylaluminum dialkoxide is hexylaluminum dihexoxide, the added aluminum trialkoxide is aluminum trihexoxide.

References Cited in the file of this patent

UNITED STATES PATENTS 2,892,858     Ziegler _____ June 30, 1959

OTHER REFERENCES

Weissberger: "Technique of Organic Chemistry," vol. VIII (Rates and Mechanisms of Reactions), 1953, pp. 422–425.